(12) United States Patent
Miller

(10) Patent No.: US 6,945,747 B1
(45) Date of Patent: Sep. 20, 2005

(54) DUAL ROTOR WIND TURBINE

(76) Inventor: Willis F. Miller, P.O. Box 52, Ogilvie, MN (US) 56358

( * ) Notice: Subject to any disclaimer, the term of this patent is extended or adjusted under 35 U.S.C. 154(b) by 0 days.

(21) Appl. No.: 10/811,447

(22) Filed: Mar. 26, 2004

(51) Int. Cl.[7] ............................................... F03D 1/04
(52) U.S. Cl. ......................... 415/4.3; 415/4.5; 415/61; 415/69; 415/908; 416/124; 416/170 R; 416/198 R; 416/201 A
(58) Field of Search ........................... 415/4.3, 4.5, 68, 415/69, 61, 908; 416/126, 170 R, 198 R, 416/201 A; 290/44, 55

(56) References Cited

U.S. PATENT DOCUMENTS

| | | | |
|---|---|---|---|
| 2,153,523 A | * | 4/1939 | Roberts et al. ............... 290/55 |
| 2,177,801 A | * | 10/1939 | Erren .......................... 290/55 |
| 3,768,546 A | | 10/1973 | Shipes |
| 3,867,062 A | | 2/1975 | Troller |
| 4,039,848 A | | 8/1977 | Winderl |
| 4,483,659 A | | 11/1984 | Armstrong |
| 5,506,453 A | | 4/1996 | McCombs |
| 6,132,172 A | | 10/2000 | Li |
| 6,278,197 B1 | | 8/2001 | Appa |
| 6,533,559 B2 | | 3/2003 | Hsieh |
| 6,856,042 B1 | * | 2/2005 | Kubota ........................ 290/55 |

* cited by examiner

Primary Examiner—Ninh H. Nguyen
(74) Attorney, Agent, or Firm—Dale J. Ream

(57) ABSTRACT

A dual rotor wind turbine according to the present invention includes a rotatable drive shaft, a first rotor assembly connected to the drive shaft, a second independently-rotating rotor assembly coupled to the drive shaft rearward of the first rotor assembly, a first stage generator coupled to the drive shaft, a second stage generator operatively connected to the second rotor assembly, a housing wherein the generators are situated, a rotary base, and a tail. In use, the rotary base allows the tail to optimally position the rotors for collecting wind. Wind rotates the first rotor assembly, causing the drive shaft to rotate and operate the first stage generator. Wind passing through and directed off the first rotor assembly rotates the second rotor assembly, independent of the first rotor assembly, operating the second stage generator. The two stage generators are any combination of AC or DC electrical generators, pumps, and compressors.

16 Claims, 5 Drawing Sheets

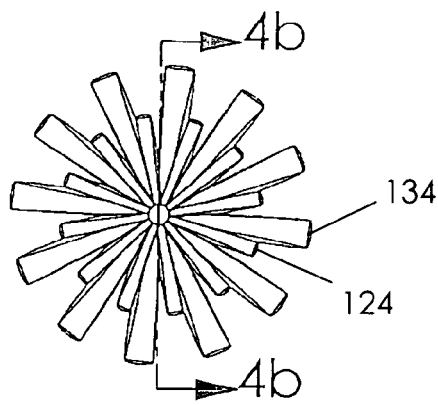
Fig. 4a
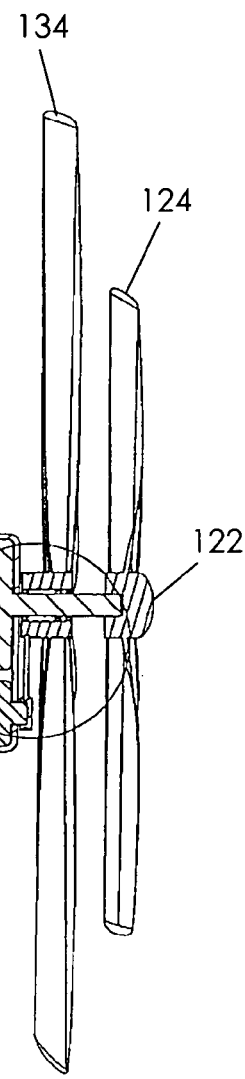
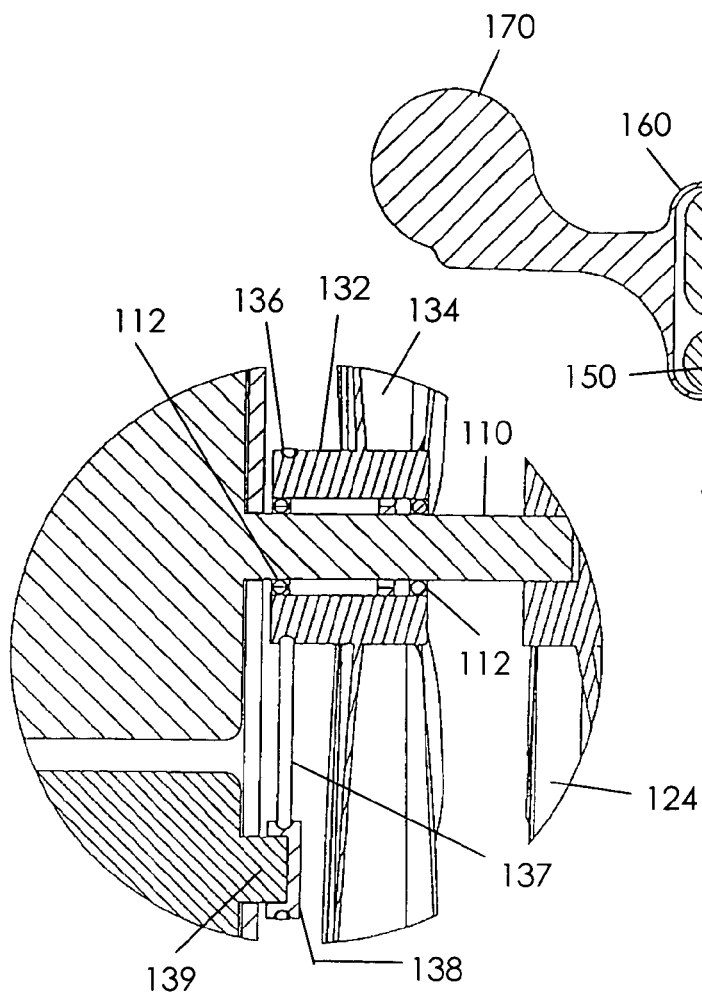
Fig. 4b
Fig. 4c

DUAL ROTOR WIND TURBINE

BACKGROUND OF THE INVENTION

This invention relates generally to wind turbines and, more particularly, to a dual rotor wind turbine that is more efficient than its predecessors and can produce multiple forms of power.

People have used the wind as a power source for years. Initial uses included pumping water and grinding flour. With the discovery of electricity and the invention of the generator, windmills have been designed to generate electric power. For a long time, however, a cheap and abundant supply of fossil fuel has powered much of the world. Unfortunately, this supply of coal and oil is limited, requires extensive energy to extract, and creates vast amounts of pollution when combusted. These concerns have led to a new interest in renewable clean energy. Wind energy can solve these problems of pollution and offer an unlimited supply of energy. A wind turbine with an efficient design can offer competitive energy prices compared with traditional ways of generating power. Once the initial capital investments are made, the wind turbines require minimal attention and minimal maintenance.

Traditionally, wind turbines use a single rotor to capture the kinetic energy of the wind. While dual rotor wind turbines are known in the art, such as in U.S. Pat. No. 4,039,848, U.S. Pat. No. 5,506,453, and U.S. Pat. No. 6,278,197, these wind turbines employ counter-rotating propellers to jointly produce a single power output. Further, the propellers are often of a single size and do not maximize the harvesting of all available wind energy.

The airstream after the first rotor on a wind turbine is moving slower than the airstream before the first rotor because the rotor extracts power from the kinetic energy of the wind. This means that the airstream is wider after the rotor. In order to harness this wind and the additional wind that is passing through the first rotor, the second rotor should be larger.

Further, there is an unmet demand to produce multiple forms of power, such as different voltages or combinations of either AC or DC electrical power, or to operate multiple combinations of generators, pumps, and compressors from a single wind turbine.

Therefore, it is desirable to have a dual rotor wind turbine that efficiently harnesses the kinetic energy of the wind, can produce multiple outputs, can be easily manufactured, and will suit a wide variety of wind speeds.

SUMMARY OF THE INVENTION

A dual rotor wind turbine according to the present invention includes a rotatable drive shaft, a first rotor assembly connected to the drive shaft, a second rotor assembly coupled to the drive shaft rearward of the first rotor assembly for independent rotation of the second rotor assembly, a first stage generator rotatably coupled to the drive shaft, a second stage generator operatively connected to the second rotor assembly, a housing wherein the first and second stage generators are situated, a rotary base, and a tail for keeping the rotors positioned into the wind.

In use, the dual rotor wind turbine is ideally placed atop a tower. The rotary base allows the tail to position the rotors in the optimal position for collecting the maximum amount of wind. The wind rotates the first rotor assembly, causing the rotatable drive shaft to rotate and operate the first stage generator. Wind that passes through the first rotor assembly and air that is directed off the first rotor assembly rotates the second rotor assembly, independent of the first rotor assembly. This causes the second stage generator to operate. The first and second stage generators can be any combination of different voltages of AC or DC electrical power generators, pumps, and compressors. The outputs can then be utilized by traditional methods. Pumps would be useful for irrigating fields, among other things, and compressors could pressurize an air tank to run pneumatic tools.

Therefore, a general object of this invention is to provide a dual rotor wind turbine that is efficient in capturing kinetic energy from wind.

Another object of this invention is to provide a dual rotor wind turbine, as aforesaid, that can produce multiple forms of power.

Still another object of this invention is to provide a dual rotor wind turbine, as aforesaid, that can be easily manufactured.

Yet another object of this invention is to provide a dual rotor wind turbine, as aforesaid, that will suit a wide variety of wind speeds.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 4a is a front view of the dual rotor wind turbine as in FIG. 2;

FIG. 4b a sectional view taken along line 4b—4b of FIG. 4a;

FIG. 4c is an isolated sectional view on an enlarged scale of a second rotor assembly connected to a second drive shaft as in FIG. 4b;

FIG. 5a is a side view of a the dual rotor wind turbine as in FIG. 2;

FIG. 5b is a sectional view taken along line 5b—5b of FIG. 5a;

DESCRIPTION OF THE PREFERRED EMBODIMENT

Figure 1:
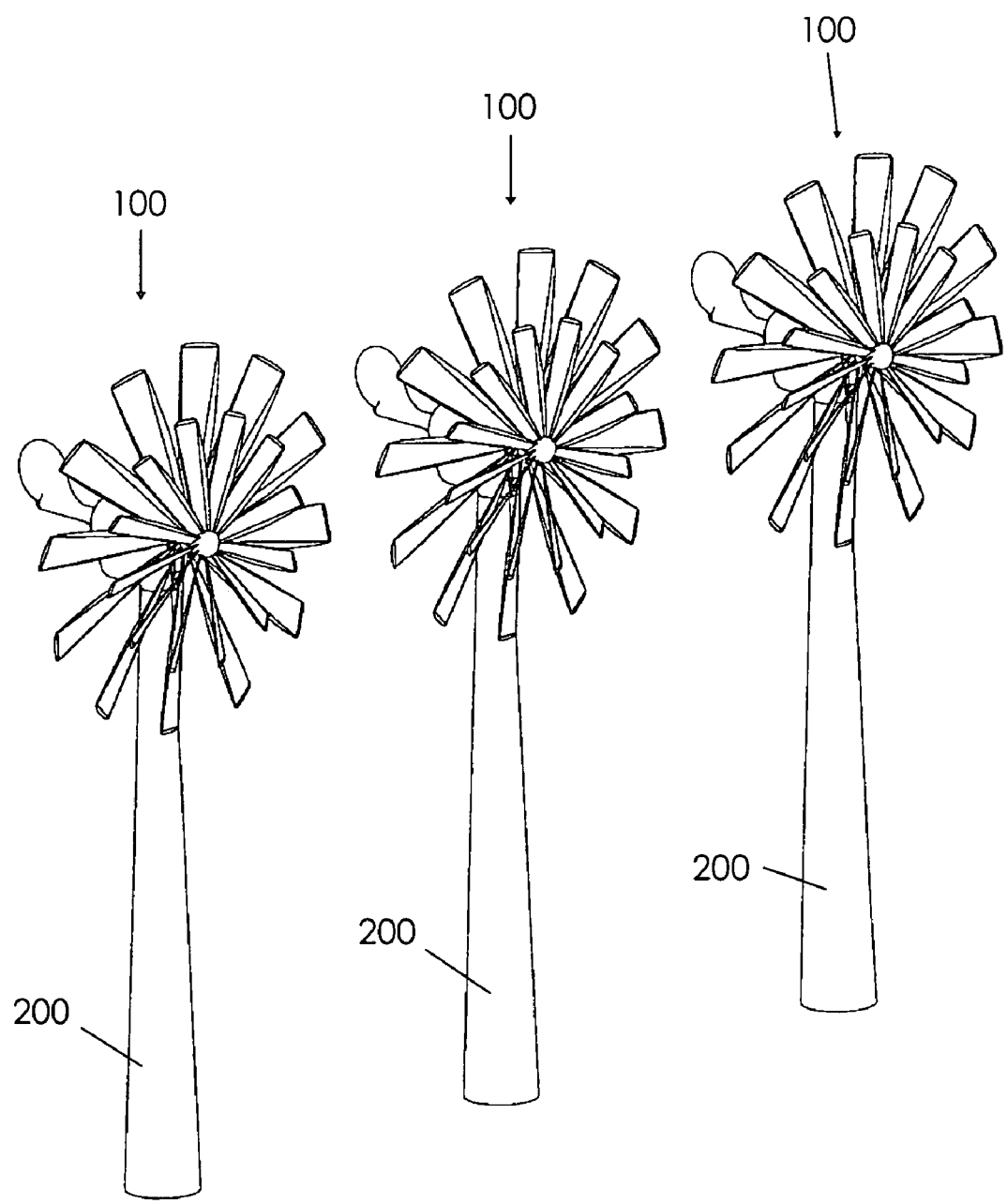
FIG. 1 is a front perspective view of three dual rotor wind turbines according to a now preferred embodiment of the present invention situated atop towers.
Figure 2:
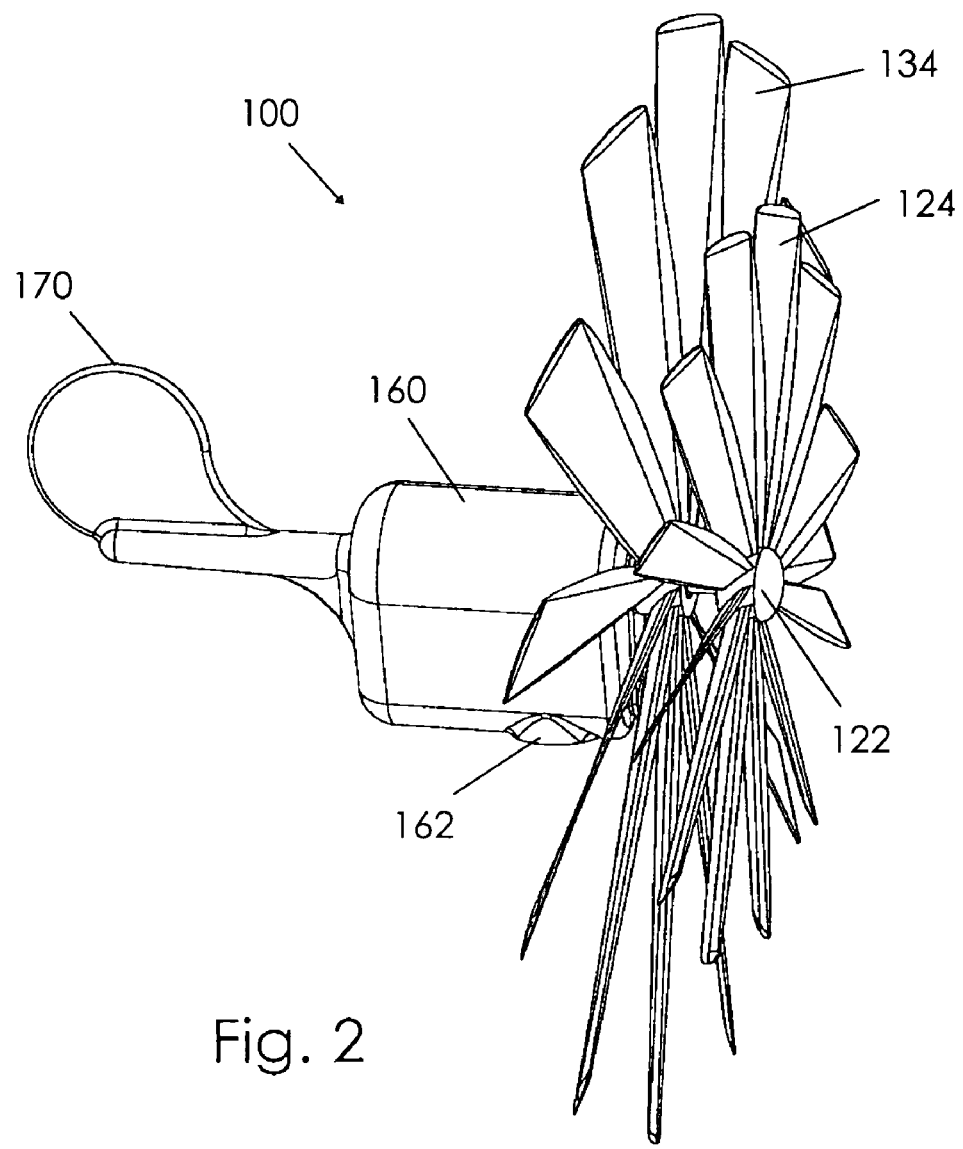
FIG. 2 is a side perspective view of the dual rotor wind turbine as in FIG. 1.

A dual rotor wind turbine according to the present invention will now be described in detail with reference to FIGS. 1 through 5 of the accompanying drawings. More particularly, a dual rotor wind turbine 100 according to a now preferred embodiment includes a rotatable drive shaft 110 connected to a first rotor assembly 120 and a first stage generator 140. The first rotor assembly 120 includes a plurality of first rotor blades 124 radially extending from a first hub 122 that is connected to the drive shaft 110 (FIG. 3).

A second rotor assembly 130 includes a plurality of second rotor blades 134 radially extending from a second hub 132. The second rotor blades 134 are preferably larger than the first rotor blades 124 in order to capture additional wind power that has shed off of or passed between the first rotor blades 124. Further, the plurality of second rotor blades 134 of the second rotor assembly 130 define an outer diameter that is larger than an outer diameter defined by the plurality of first rotor blades 124 of the first rotor assembly 120. The second hub 132 is coupled to the drive shaft 110 rearward of the first rotor assembly 120 by bearings 112 to allow the second rotor assembly 130 to rotate independently of the first rotor assembly 120 (FIG. 4c). The second rotor blades 134 are preferably angled to rotate in the same direction as the first rotor blades 124 when an air stream passes across them to efficiently capture the wind power. The second rotor assembly 130 is operatively connected to a second stage generator 150. This can be accomplished by a pulley 136 on the second hub 132 driving a belt 137 to turn a pulley 138 connected to a second drive shaft 139 that operates the second stage generator 150 (FIG. 4c). By sizing the pulleys 136, 138 differently, a gear ratio can be created to optimize the speed of the second rotor assembly 130 to the speed of the second drive shaft 139. Of course, other methods of connecting the second rotor assembly 130 to the second stage generator 150 would also be suitable.

Figures 5A, 5B:
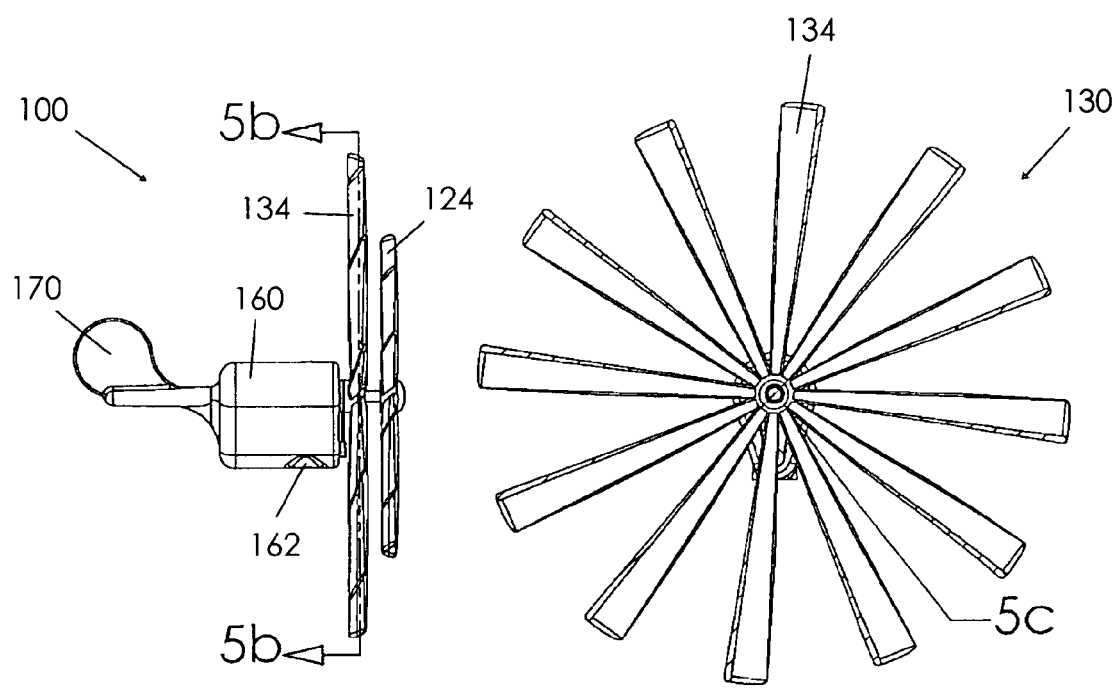
Figure 5C:
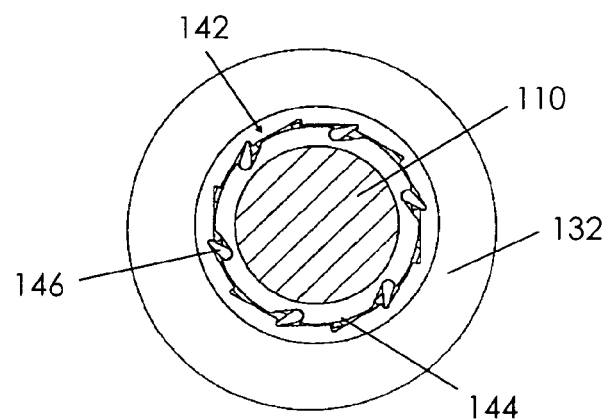
FIG. 5c is an isolated sectional view on an enlarged scale of a second rotor assembly as in FIG. 5b.

The second rotor assembly hub 132 is coupled to the drive shaft 110 with a ratchet assembly 142. Specifically, the second hub 132 includes a plurality of teeth 144 and the drive shaft 110 includes a plurality of teeth 144 (FIG. 5c). The ratchet assembly 142 is configured such that the drive shaft 110 is permitted to spin freely if it is spinning faster than the hub 132. However, the pawls 146 engage the teeth 144 when the second hub 132 is spinning at least as fast as the drive shaft 110. With this assembly, the drive shaft 110 is not slowed down when the second rotor assembly 130 is not operating as fast as the first rotor assembly 120, but is aided when the second rotor assembly 130 is operating as fast or faster than the first rotor assembly 120. Even when the drive shaft 110 spins freely through a slower moving second rotor assembly 130, it should be appreciated that the power of the slower moving second rotor assembly 130 is still being harvested by its coupling to the second drive shaft 139 and second stage generator 150.

Figure 3:
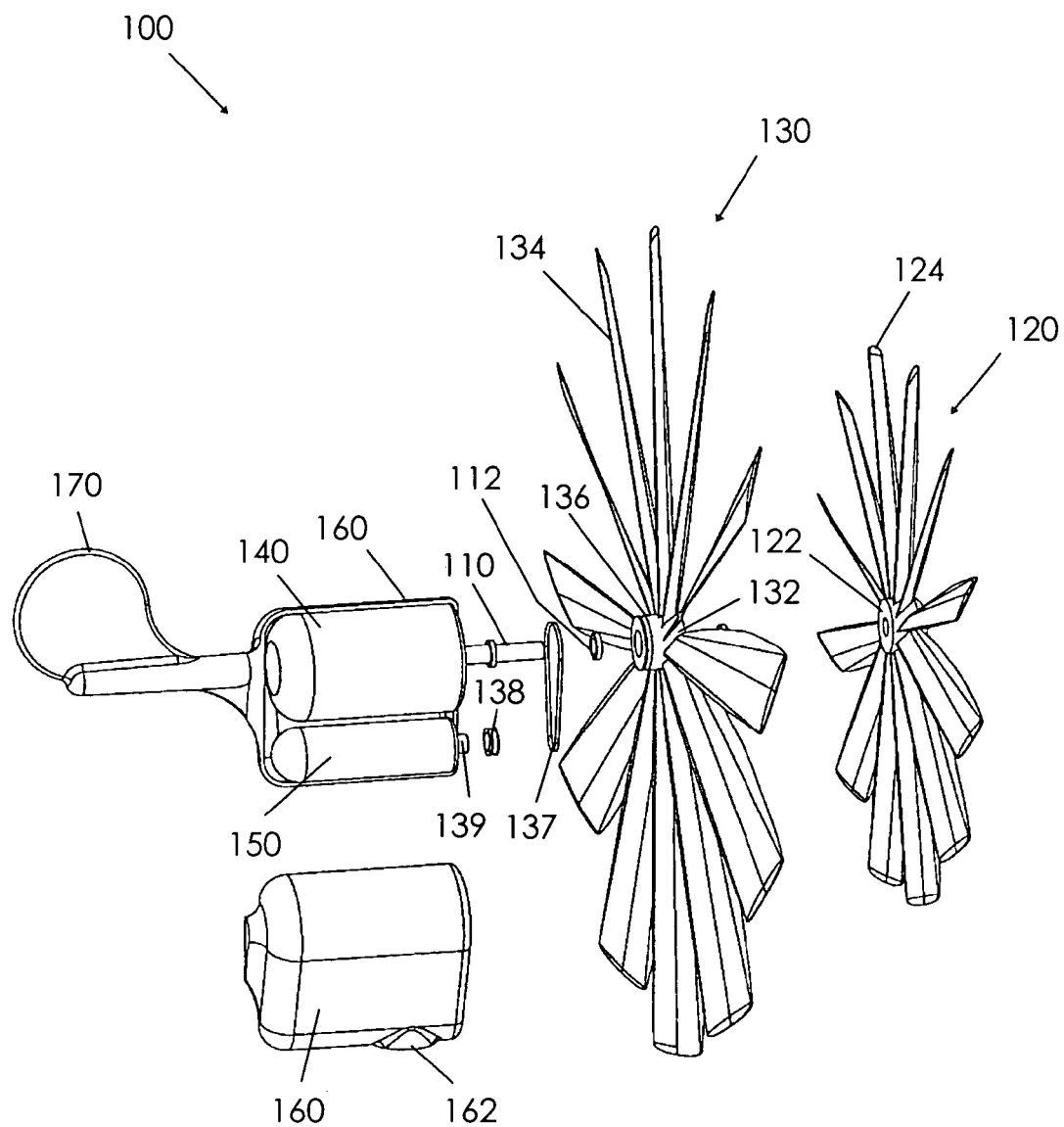
FIG. 3 is an exploded view of the dual rotor wind turbine as in FIG. 2.

A housing unit 160 defining an interior space 162 houses the first stage generator 140 and the second stage generator 150 and supports the drive shaft 110 and the second drive shaft 139 (FIGS. 3, 4b, 4c). A rotary base 162 is located at the bottom of the housing unit 160. The rotary base 162 allows the rotor assemblies 120, 130 to directly face the wind regardless of the direction that the wind blows. A tail 170 extends from the housing unit 160 to position the rotor assemblies 120, 130 in the optimal position for collecting the maximum amount of wind. The tail 170 aligns the dual rotor wind turbine 100 because the position of stability for the dual rotor wind turbine 100 is when the tail 170 is downwind.

The first and second stage generators 140, 150 can be any combination of different voltages of AC or DC electrical power generators, pumps, and compressors. The output mechanisms are traditional and not shown.

In use, the rotary base 162 of the dual rotor wind turbine 100 is mounted in a location that will provide the dual rotor wind turbine 100 with a wind source. Since the driving factor in the power available in the wind is proportional to the velocity of the wind cubed, doubling the wind speed increases the power available by a factor of 8. Because air near ground level is very turbulent due to interactions with trees, buildings, and other obstacles, and this turbulence reduces air speed, a higher tower 200 is beneficial to reach less turbulent air that is moving faster (FIG. 1). The dual rotor wind turbine 100 can be scaled from portable units to home sized units up to large utility sized units, and multiple units may be used in a wind farm. It is possible, then, to place a portable-sized dual rotor wind turbine 100 on trucks, RV's, boats, and remote telecommunications towers. After the dual rotor wind turbine 100 is mounted, wind causes the tail 170 to automatically position the dual rotor wind turbine 100 in the optimal position for collecting the maximum amount of wind as described above. In other words, the rotary base 162 and tail 170 enable the first 120 and second 130 rotor assemblies to be oriented into the wind and maintained in that orientation. The wind causes the first rotor assembly 120 to turn/spin, which rotates the drive shaft 110 and causes the first stage generator 140 to operate. Wind that has shed off of or passed between the first rotor blades 124 causes the second rotor assembly 130 to turn in the same direction as, but independent from, the first rotor assembly 120. The second rotor assembly 130 is connected to the second drive shaft 139 as described above, and the rotation of the second rotor assembly 130 causes the second drive shaft 139 to rotate. The rotation of the second drive shaft 139 causes the second stage generator 150 to operate. The products of the first stage generator 140 and the second stage generator 150 can then be utilized.

It is understood that while certain forms of this invention have been illustrated and described, it is not limited thereto except insofar as such limitations are included in the following claims and allowable functional equivalents thereof.

What is claimed is:

1. A high efficiency dual rotor wind turbine, comprising:
   a rotatable drive shaft;
   a first rotor assembly having a plurality of first rotor blades radially extending from a first hub that is connected to said drive shaft;
   a second rotor assembly having a plurality of second rotor blades radially extending from a second hub;
   means for coupling said second hub to said drive shaft rearward of said first rotor assembly for rotation of said second rotor assembly thereabout independent of rotation of said first rotor assembly;
   a first stage generator rotatably coupled to said drive shaft;
   a second stage generator operatively connected to said second rotor assembly;
   a housing defining an interior space;
   wherein said first and second stage generators are situated in said housing; and
   wherein said second rotor assembly is positioned intermediate said first rotor assembly and said housing.

2. The wind turbine as in claim 1 wherein said coupling means is a plurality of bearings.

3. The wind turbine as in claim 1 wherein said first rotor assembly includes a first diameter and said second rotor assembly includes a second diameter larger than said first diameter.

4. The wind turbine as in claim 1 further comprising means for rotatably orienting said first and second rotor assemblies into the wind.

5. The wind turbine as in claim 1 further comprising a tail rearward of said second rotor assembly for maintaining the orientation of said first and second rotor assemblies into the wind.

6. The wind turbine as in claim 1 wherein said plurality of second rotor blades are angled for rotating said second rotor assembly in the same direction as said first rotor assembly.

7. The wind turbine as in claim 1 wherein pulleys and a belt operatively connect said second stage generator to said second rotor assembly.

8. The wind turbine as in claim 1 wherein:
said first stage generator is an ac electrical generator, a dc electrical generator, a pump, or a compressor; and
said second stage generator is an ac electrical generator, a dc electrical generator, a pump, or a compressor.

9. The wind turbine as in claim 1 wherein said housing includes a rotary base for rotation of said wind turbine.

10. A high efficiency dual rotor wind turbine, comprising:
a rotatable drive shaft;
a first rotor assembly having a plurality of first rotor blades radially extending from a first hub that is connected to said drive shaft such that said drive shaft is rotated upon passage of an air stream across said plurality of first rotor blades;
a second rotor assembly having a plurality of second rotor blades radially extending from a second hub;
means for coupling said second hub to said drive shaft rearward of said first rotor assembly for rotation of said second rotor assembly thereabout independent of rotation of said first rotor assembly, whereby said drive shaft is further rotated upon passage of said air stream across said second plurality of second rotor blades;
means for rotatably orienting said first and second rotor assemblies into the wind;
a tail rearward of said second rotor assembly for maintaining the orientation of said first and second rotor assemblies into the wind;
a first stage generator rotatably coupled to said drive shaft for actuation thereby;
a second stage generator operatively connected to said second rotor assembly;
wherein said first rotor assembly includes a first diameter and said second rotor assembly includes a second diameter larger than said first diameter.

11. The wind turbine as in claim 10 further comprising:
a housing defining an interior space;
wherein said first and second stage generators are situated in said housing; and
wherein said second rotor assembly is positioned intermediate said first rotor assembly and said housing.

12. The wind turbine as in claim 10 wherein:
said first stage generator is an ac electrical generator, a dc electrical generator, a pump, or a compressor; and
said second stage generator is an ac electrical generator, a dc electrical generator, a pump, or a compressor.

13. The wind turbine as in claim 12 wherein said first rotor assembly includes a first diameter and said second rotor assembly includes a second diameter larger than said first diameter.

14. The wind turbine as in claim 12 further comprising:
a housing defining an interior space;
wherein said first and second stage generators are situated in said housing; and
wherein said second rotor assembly is positioned intermediate said first rotor assembly and said housing.

15. The wind turbine as in claim 14 wherein said first rotor assembly includes a first diameter and said second rotor assembly includes a second diameter larger than said first diameter.

16. The wind turbine as in claim 10 wherein said means for coupling said second rotor assembly to said drive shaft includes a ratchet assembly for engaging said drive shaft when said second rotor assembly is rotating at least as fast as said first rotor assembly and for releasing said drive shaft to rotate freely if said second rotor assembly is rotating slower than said first rotor assembly.

* * * * *